US007004621B2

(12) United States Patent
Roberts et al.

(10) Patent No.: US 7,004,621 B2
(45) Date of Patent: Feb. 28, 2006

(54) METHOD OF MONITORING TEMPERATURE EXPOSURE

(75) Inventors: William Peyton Roberts, Spartanburg, SC (US); Tim McInerney, Ridgefield, CT (US)

(73) Assignee: Cryovac, Inc., Duncan, SC (US)

(*) Notice: Subject to any disclaimer, the term of this patent is extended or adjusted under 35 U.S.C. 154(b) by 44 days.

(21) Appl. No.: 10/870,697

(22) Filed: Jun. 17, 2004

(65) Prior Publication Data
US 2005/0281311 A1   Dec. 22, 2005

(51) Int. Cl.
*G01K 3/00*   (2006.01)
(52) U.S. Cl. ............ 374/106; 374/163; 374/186; 702/187
(58) Field of Classification Search ........... 374/106, 374/103, 186, 102, 104
See application file for complete search history.

(56) References Cited

U.S. PATENT DOCUMENTS

| | | | | |
|---|---|---|---|---|
| 3,910,119 | A | * | 10/1975 | Maxwell ............. 374/186 |
| 4,735,745 | A | | 4/1988 | Preziosi et al. |
| 4,812,053 | A | | 3/1989 | Bhattacharjee |
| 4,892,677 | A | | 1/1990 | Preziosi et al. |
| 4,972,099 | A | * | 11/1990 | Amano et al. ........ 374/102 |
| 5,057,434 | A | | 10/1991 | Prusik et al. |
| 5,313,848 | A | | 5/1994 | Santin et al. |
| 5,368,905 | A | * | 11/1994 | Ohno ................ 374/160 |
| 5,442,669 | A | | 8/1995 | Medin |
| 5,667,303 | A | | 9/1997 | Arens et al. |
| 5,709,472 | A | | 1/1998 | Prusik et al. |
| RE36,200 | E | * | 4/1999 | Berrian et al. ........ 374/104 |
| 5,997,927 | A | * | 12/1999 | Gics .............. 374/102 |
| 6,042,264 | A | | 3/2000 | Prusik et al. |
| 6,185,513 | B1 | | 2/2001 | Plettner et al. |
| 6,320,512 | B1 | | 11/2001 | Nicholson et al. |
| 6,326,892 | B1 | * | 12/2001 | De La Forterie ....... 374/102 |

(Continued)

FOREIGN PATENT DOCUMENTS

GB         2152673 A  *  8/1985

(Continued)

OTHER PUBLICATIONS

Taoukis et al., "Chemical Time-Temperature Integrations As Quality Monitors In The Chill Chain," 1997, (no month).

(Continued)

*Primary Examiner*—Diego Gutierrez
*Assistant Examiner*—Stanley J. Pruchnic, Jr.
(74) *Attorney, Agent, or Firm*—Alston & Bird LLP

(57) ABSTRACT

The invention is a method of monitoring the temperature to which an object has been exposed. The invention comprises combining a Time-Temperature Indicator (TTI) with an electronic monitoring device to determine whether the temperature to which the object has been exposed may have exceeded a predetermined threshold. The TTI device can be used to make a rapid initial determination as to the acceptability of the temperature history. The temperature history stored in the electronic monitoring device can be retrieved if visual inspection of the TTI indicates that the temperature history may possibly have exceeded the predetermined threshold. As a result, rejection of goods based on inaccurate TTI readings can be reduced or prevented, and the amount of time needed to retrieve data from an electronic monitoring device can be limited to only those circumstances where the initial visualization of the TTI indicates the possibility of an unacceptable temperature history.

20 Claims, 7 Drawing Sheets

U.S. PATENT DOCUMENTS

| | | | |
|---|---|---|---|
| 6,411,916 B1 * | 6/2002 | Pellerin | 702/130 |
| 6,544,925 B1 | 4/2003 | Prusik et al. | |
| 6,563,417 B1 | 5/2003 | Shaw | |
| 6,629,057 B1 * | 9/2003 | Zweig et al. | 374/102 |
| 6,737,274 B1 | 5/2004 | Wright | |
| 6,757,492 B1 * | 6/2004 | Hall | 374/102 |
| 6,950,028 B1 * | 9/2005 | Zweig | 702/130 |
| 2001/0027741 A1 | 10/2001 | Qiu et al. | |
| 2002/0072079 A1 | 6/2002 | Woodaman | |
| 2003/0029373 A1 | 2/2003 | Cooperman | |
| 2003/0139903 A1 | 7/2003 | Zweig et al. | |
| 2004/0008752 A1 * | 1/2004 | Prabhakar | 374/102 |
| 2004/0018641 A1 | 1/2004 | Goldsmith et al. | |
| 2004/0156418 A1 * | 8/2004 | Debord et al. | 374/103 |

FOREIGN PATENT DOCUMENTS

| | | | |
|---|---|---|---|
| JP | 55074430 A | * | 6/1980 |
| JP | 63238436 A | * | 10/1988 |
| JP | 01227029 A | * | 9/1989 |
| WO | WO 01/64430 A1 | | 9/2001 |

OTHER PUBLICATIONS

Fresh-Check® TTIs for Food Applications (1 page); available at http://www.lifelinestechnology.com/foodhealth.html, (no date).

VITSAB (2 pages); available at http://www.vitsab.com, Time Temperature Indicator (TTI) (no date).

TempSense® (1 page); available at http://www.ksw-microtec.de/home/content/e050102.html (no date).

Diagnostic Packaging by Sara Ver-Bruggen, Managing Editor Newsletters, Pira International; available at http://www.pira.atalink.co.uk/packaging/142.html (no date).

Preliminary Report Version 1.1; Vitsab® L4-9 Formulation and Validation Testing; Cox Technologies, Inc. Belmont, NC (16 pages); http://www.vitsab.com/PDF/L4-9%20Preliminary%20Report%20and%20ValidationV1.1.pdf (no date).

Leak et al.; Vitsab® Time-Temperature Indicator (TTI) Packer to Retailer Ground Beef Study; (12 pages); http://www.vitsab.com/PDF/V506.pdf (2000) (no month).

* cited by examiner

METHOD OF MONITORING TEMPERATURE EXPOSURE

BACKGROUND OF THE INVENTION

The invention relates generally to a method and apparatus for monitoring environmental conditions, and more particularly to a method and apparatus for determining whether an object has been exposed to a temperature that has exceeded a predetermined threshold.

There are many circumstances where it may be desirable to monitor, control, and record the environmental parameters of a given environment. For example, the quality and safety of pharmaceuticals, food products, chemicals, and biological products can be adversely affected by improper temperature control during processing, distribution, and storage.

A number of different devices have been developed to monitor and record changes in temperature over a period of time. Time-Temperature Indicators (TTI) are devices that can be used for monitoring the time-temperature history of various products. TTI devices generally use a change in physical appearance to indicate temperature exposure. Electronic monitoring devices are a second type of device that may be used to monitor temperature exposure. Electronic monitoring devices are typically small portable devices that include instruments and memory for measuring and storing temperature readings.

TTIs typically use mechanical, chemical, electrochemical, enzymatic, or microbiological change that may be expressed as a visible response in the form of a mechanical deformation, color development, or color movement. The rate of change can be temperature dependent so that it increases at higher temperatures. As a result, the physical response may be used to give a cumulative indication of the temperature conditions to which the TTI has been exposed. TTI devices can usually be activated in a variety of ways, such as removing from very cold storage, mixing two liquids together or bringing two layers into contact. Typically, these TTI devices are inexpensive and may be in the form of a label that can be attached or adhered to packages or objects. One advantage of TTI devices is that they can be quickly and easily visually inspected. A disadvantage of TTI devices is that the indicators may give false readings. False readings could result in the disposal or rejection of otherwise acceptable goods.

Electronic monitoring devices, such as data loggers, can be used to monitor and record a variety of different environmental parameters. Data loggers are small, battery-powered devices that may be equipped with a microprocessor, instruments, and a memory for storing data. Data loggers may be programmed to take specific measurements at desired time intervals. Data loggers can be used to create a more complete and accurate picture of any changes in environmental conditions. To retrieve the stored data, the data logger must be connected to a computer or reader that can retrieve and display the stored temperature readings. This may require additional time and labor to retrieve and analyze the data, and it may require additional equipment to process a larger number of data loggers. As a result, processing goods associated with electronic monitoring devices, such as a data logger, can be expensive, time-consuming, and inefficient. Some data loggers include LED displays that can digitally display temperature history. However, these data loggers are typically more expensive, and as a result, can be cost prohibitive. In addition, it may not be easy to quickly read an LED display because the electronic monitoring device could be disposed within a container or packaging envelope.

Thus, a need still exists to provide a method and apparatus for monitoring temperature exposure that can be performed rapidly and inexpensively, while at the same time maintaining accuracy.

SUMMARY OF THE INVENTION

The invention is a method and apparatus for monitoring the temperature to which an object has been exposed that combines a Time-Temperature Indicator (TTI) that can be rapidly inspected to determine if the temperature may have exceeded a predetermined threshold, and an electronic monitoring device (EM device) that can be analyzed to verify the accuracy of the TTI if visual inspection of the TTI indicates the possibility that the threshold may have been exceeded. As a result, objects or goods having the TTI label/EM device combination can be rapidly and efficiently inspected, while at the same time ensuring the accuracy of the TTI readings.

The TTI device can be used to make a rapid initial determination as to the acceptability of the temperature history. The temperature history stored in the electronic monitoring device can be retrieved if visual inspection of the TTI indicates that the temperature history may possibly have exceeded the predetermined threshold. The combination of the TTI label and EM device overcomes disadvantages that may be associated with using a TTI or an EM device separately.

The invention may combine the advantages of both a TTI and an EM device. The TTI can be used to make a rapid preliminarily determination as to whether a temperature threshold may have been exceeded without having to retrieve stored data from an accompanying EM device. Using TTIs as an initial indicator of temperature history can reduce or eliminate the need to retrieve data stored on each electronic monitoring device. In turn, the EM device can verify the accuracy of an unacceptable temperature history indicated on a TTI. As a result, rejection of goods based on inaccurate TTI readings can be reduced or prevented, and the amount of time needed to retrieve data from an EM device can be limited to only those circumstances where the initial visualization of the TTI indicates the possibility of an unacceptable temperature history. An unacceptable TTI reading alone is not a basis for rejecting the goods being monitored, but an acceptable TTI reading may be a basis for accepting the goods. It is possible to select TTI devices that may have a tendency to prematurely indicate an unacceptable temperature history, so that an unacceptable reading can be interpreted as an indication of increased potential for an unacceptable temperature history, and an acceptable reading can be interpreted as more conclusive. In addition, the amount of EM device readers required throughout the distribution or processing system may be reduced because the initial determination is based on the TTI and not on the EM device.

The method may comprise attaching both a TTI and an EM device to an object that is to be monitored. The TTI and the EM device may be activated within a relatively short time period of each other. After the activated TTI and EM device have performed their respective temperature monitoring functions, the TTI may be visually inspected to determine whether the temperature-time exposure may have exceeded the threshold. If the TTI indication is acceptable, the object or goods may be processed in the normal course of business. In the event the TTI indicates a possible unacceptable temperature history, the stored temperature readings on the EM device can be retrieved to verify if there has been an unacceptable temperature exposure. If the EM device verifies that the object or goods have been exposed to unacceptable temperature, the goods or object can be rejected, disposed of, given expedited treatment, or the like.

TTI devices that are useful in the invention include devices that may use mechanical, chemical, electrochemical, enzymatic, or microbiological change to indicate through a visible response that the predetermined threshold may have been exceeded. The visible response may be expressed in the form of a mechanical deformation, color development, or color movement. In some embodiments, the TTI may be in the form of a label comprising an adhesive layer that can easily be adhered or attached to a surface or object.

Electronic monitoring devices that may be useful in the invention may include small portable devices, such as data loggers that are battery powered and comprise instruments for monitoring temperature, memory for storing temperature readings, and a microprocessor for controlling the operations of the electronic monitoring device. In some embodiments, the EM device may include a radio frequency identification (RFID) communication means or interface for wireless communication with a reader.

The TTI and EM device may be attached to an object or in close proximity to each other in a wide variety of ways. In one embodiment, the TTI labels may be attached directly to the EM device, which is then disposed in a temperature monitoring relationship with the object. In an alternate embodiment, the EM device can be disposed in an envelope that is attached to an object or package, or that is disposed within the package. The TTI may be adhered directly to the envelope or adhered to the object or goods.

Thus, the invention may provide a method and apparatus for quickly and efficiently monitoring the temperature to which an object has been exposed that reduces the possibility of rejecting acceptable goods based on an inaccurate TTI reading while at the same time, limiting the number of EM devices that need to be analyzed. The invention may also enable the efficient use of EM devices having no integral visual display, or EM devices that are disposed in a manner in which the integral display is not readily visible.

BRIEF DESCRIPTION OF THE DRAWINGS

Figure 1:
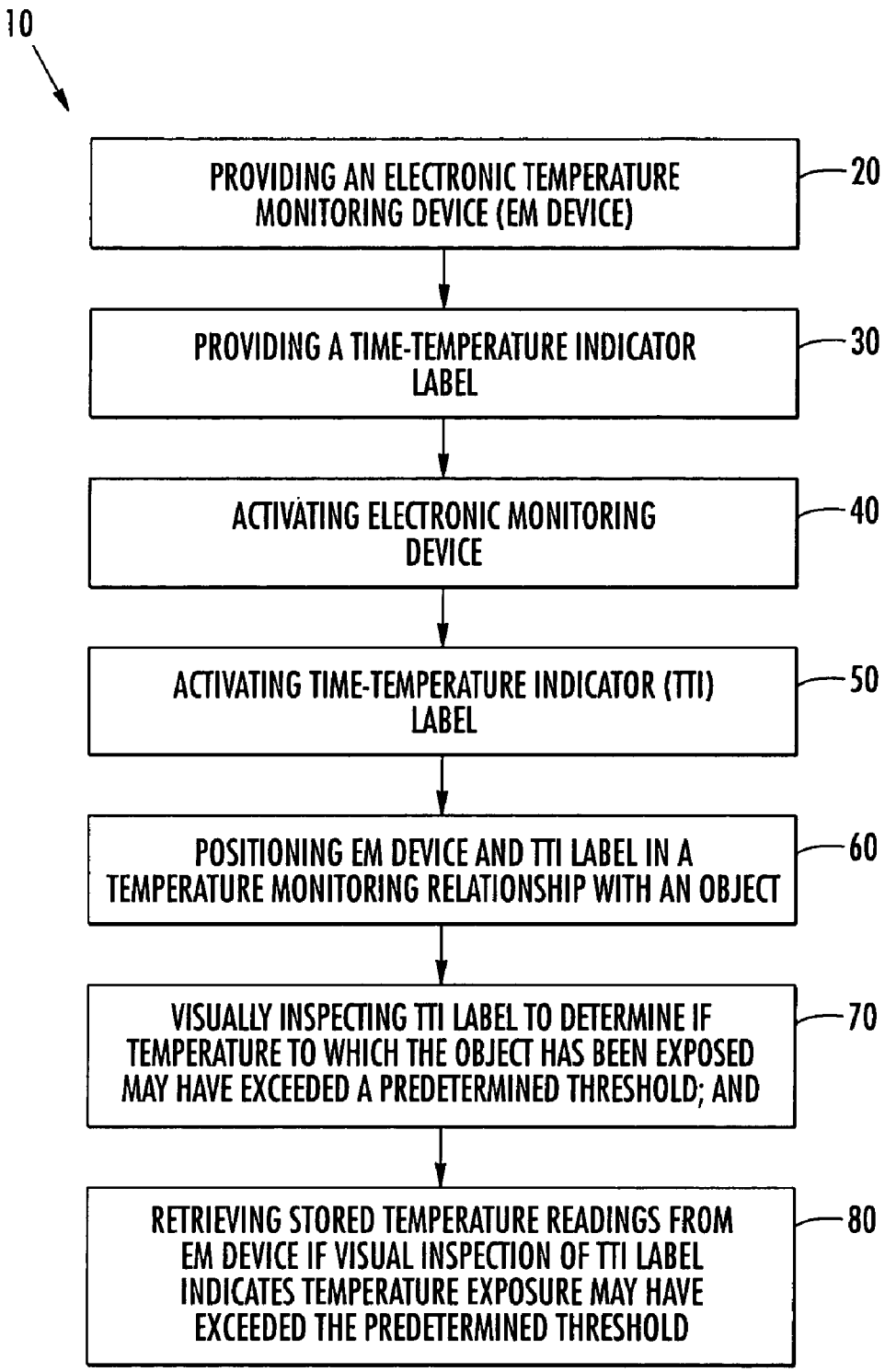
Figure 2:
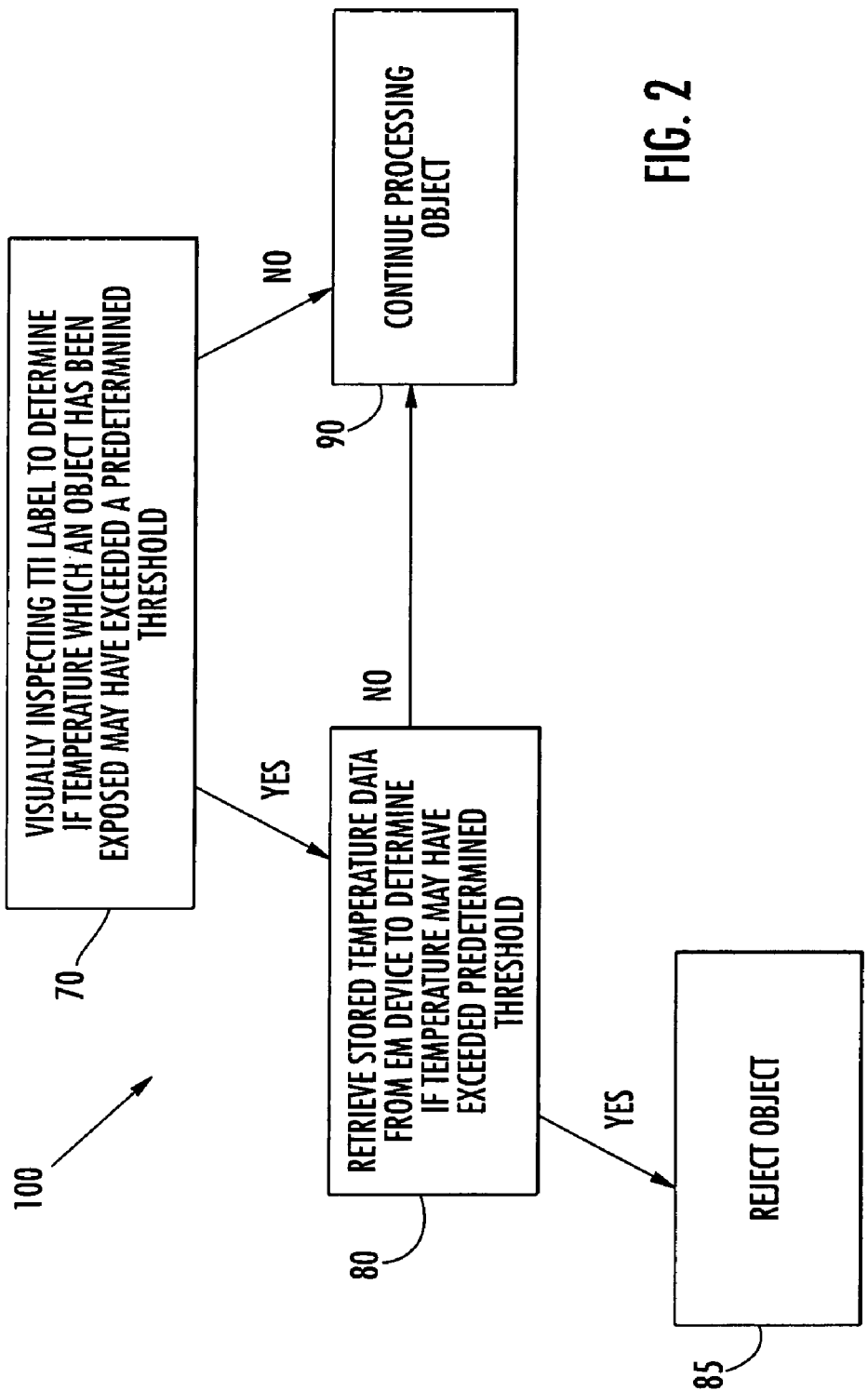
Figure 3:
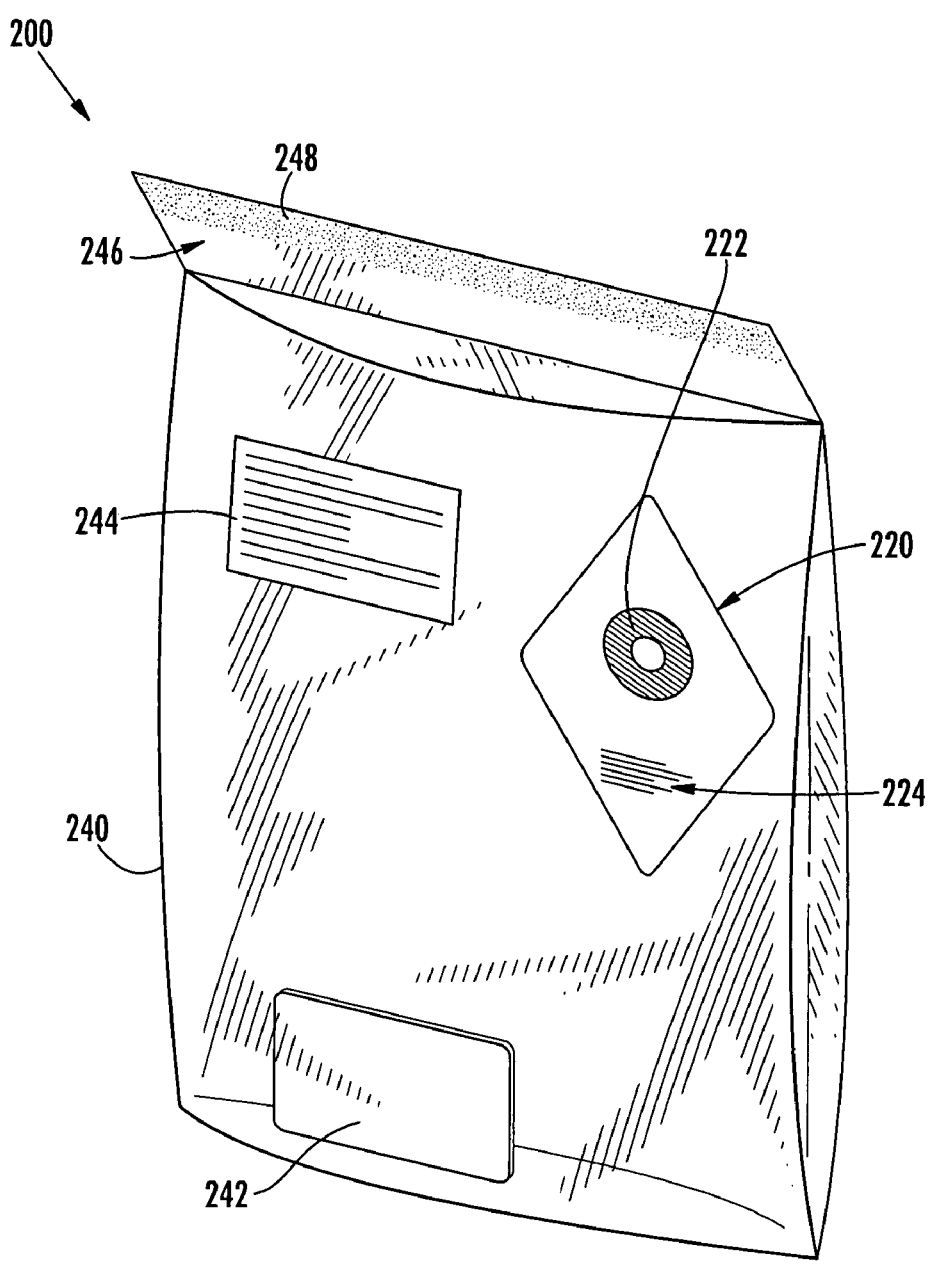
Figure 4:
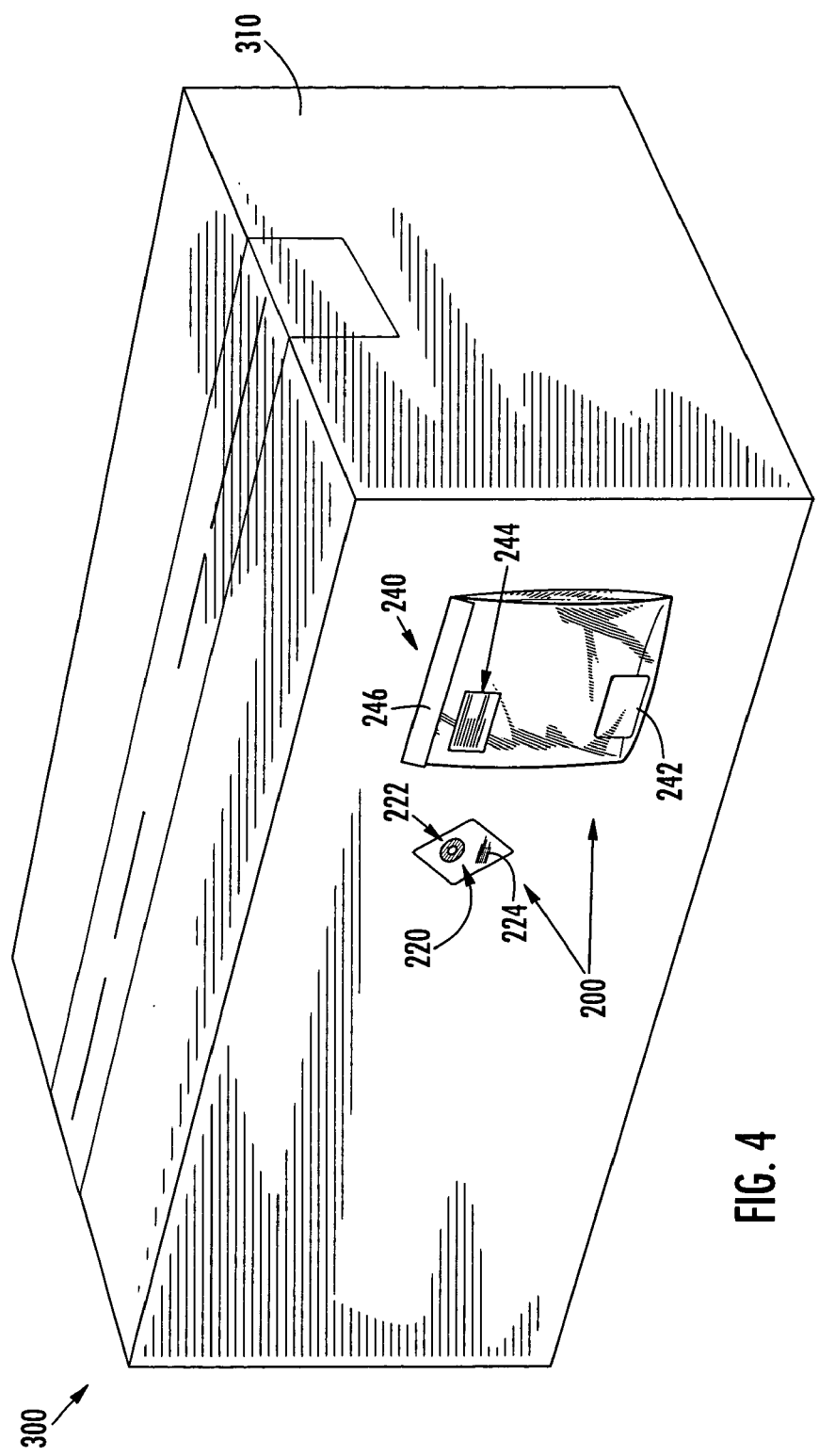
Figure 5:
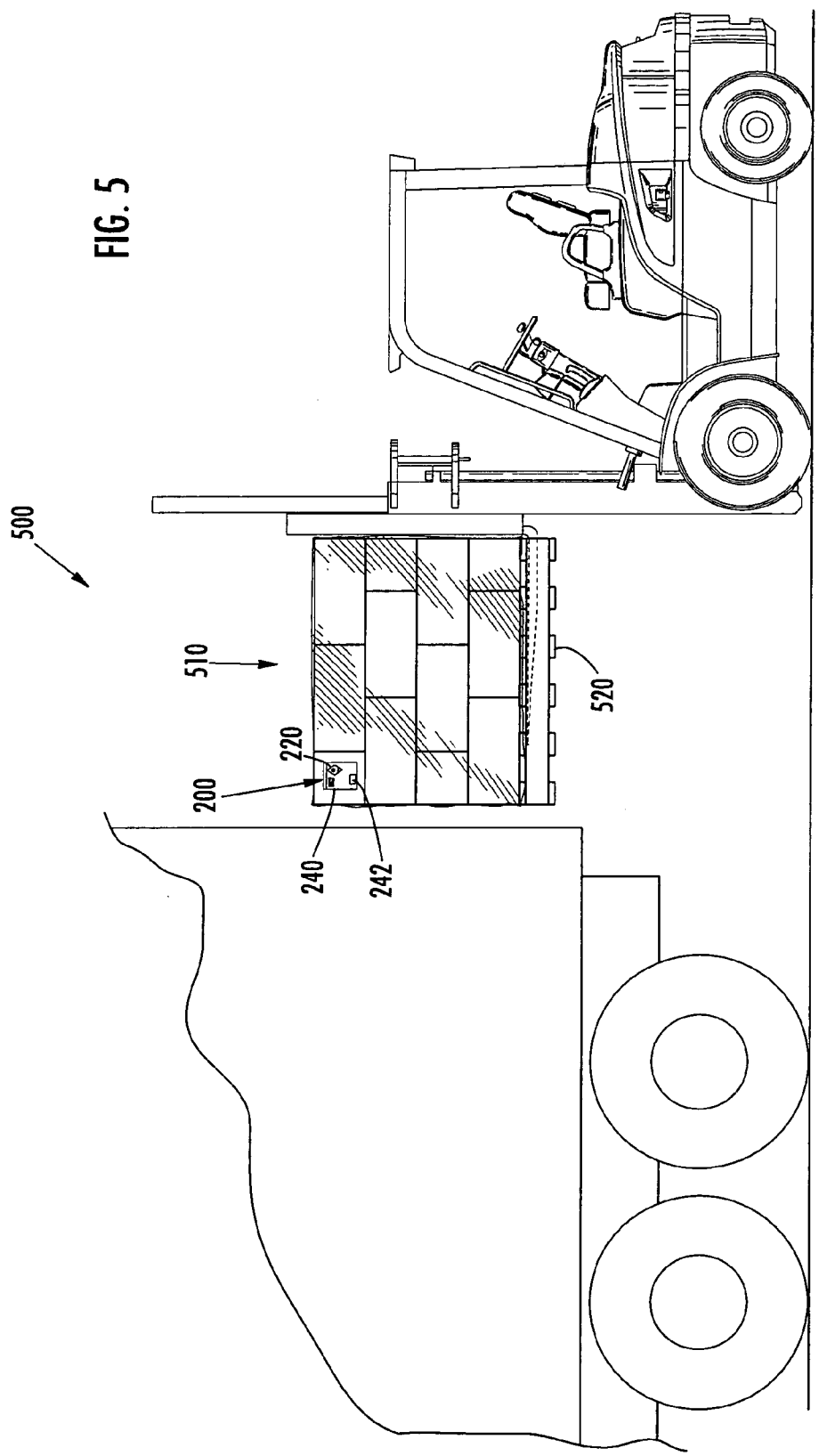
Figure 6A:
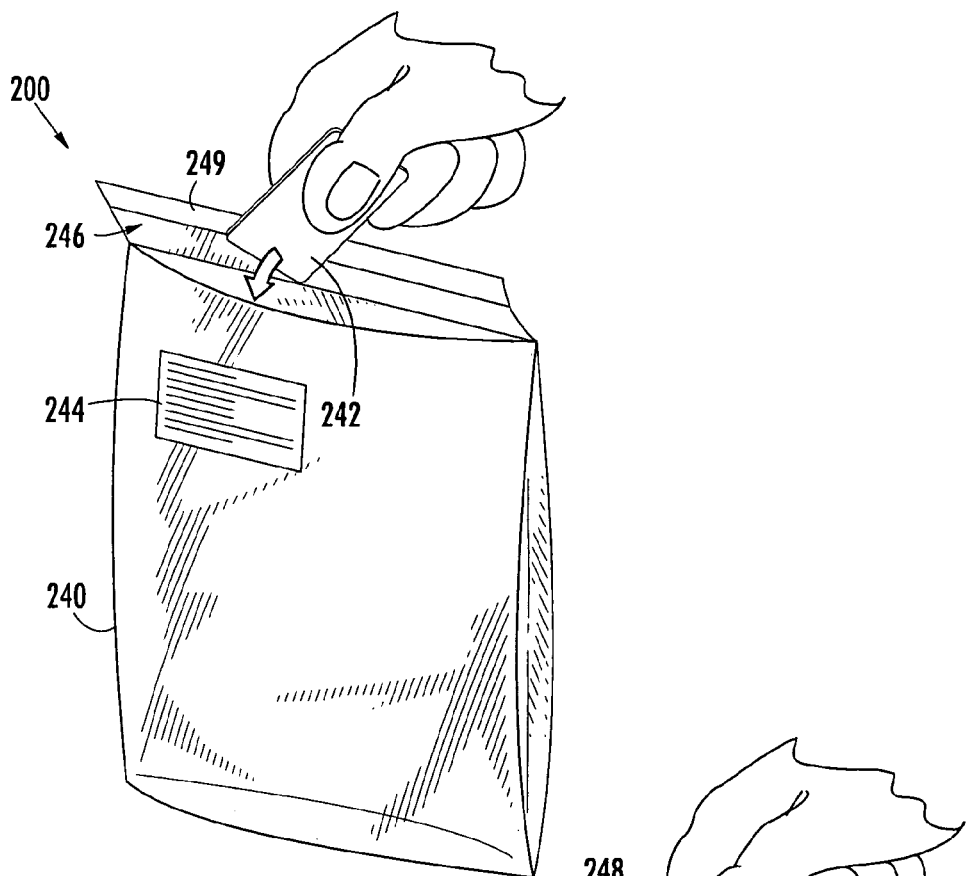
Figure 6B:
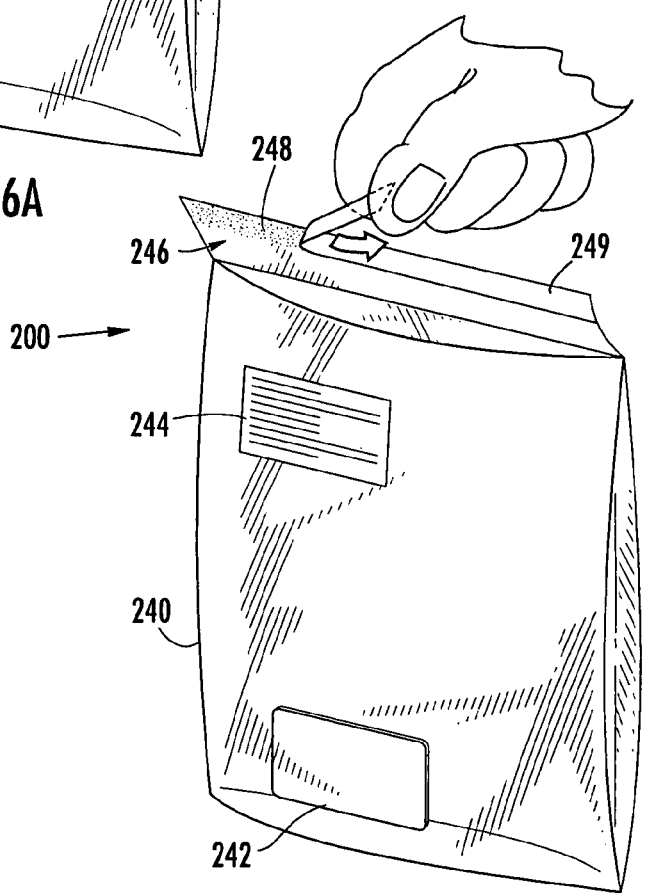
Figure 6C:
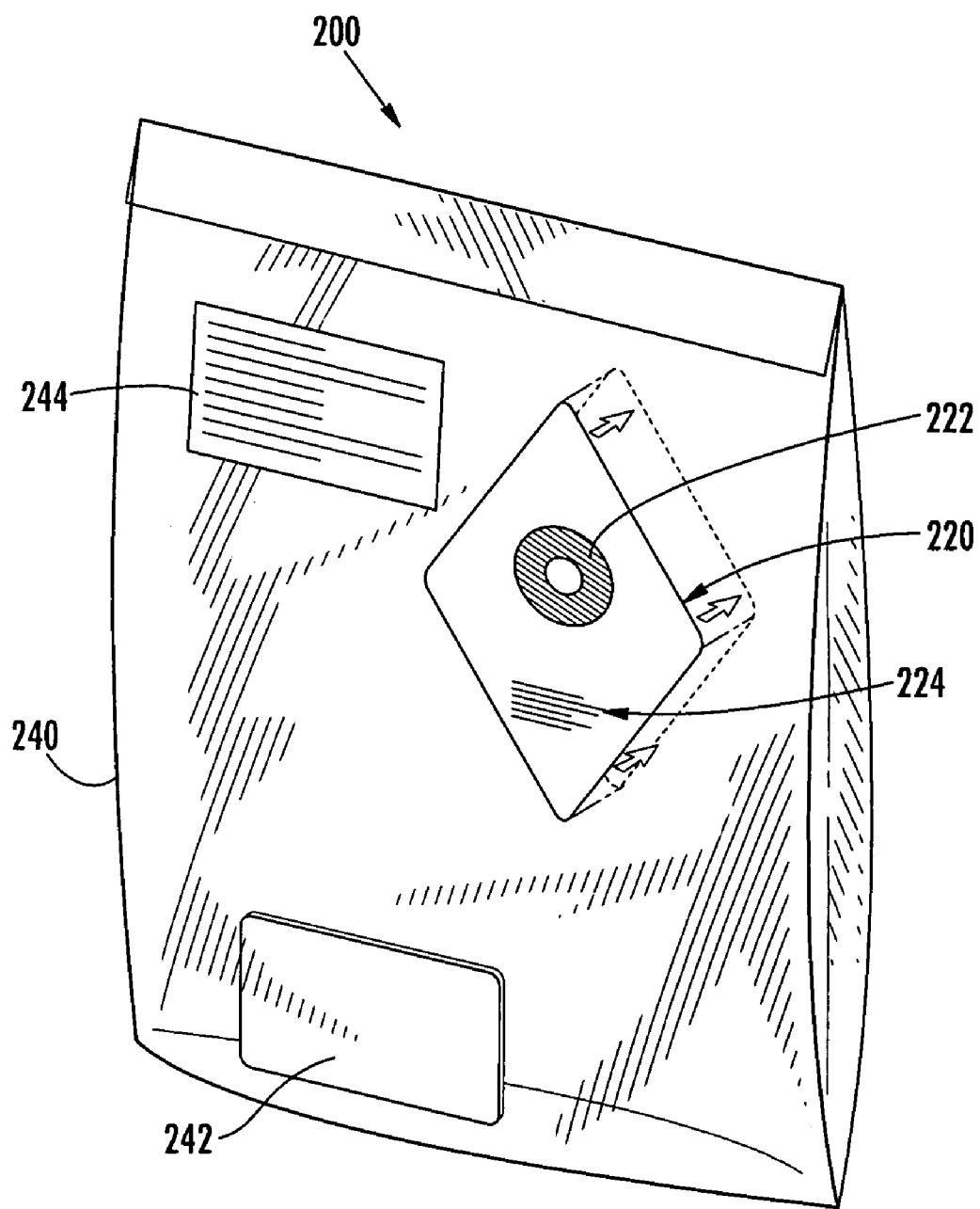

Having thus described the invention in general terms, reference will now be made to the accompanying drawings, which are not necessarily drawn to scale, and wherein:

FIG. 1 is a block diagram illustrating a method in accordance with the invention;

FIG. 2 is a block diagram further illustrating a method in accordance with the invention;

FIG. 3 is a graphical illustration depicting an envelope containing an electronic monitoring device and having a Time-Temperature Indicator affixed to the outer surface of the envelope;

FIG. 4 is a graphical illustration of an object having a combination of a Time-Temperature Indicator and an electronic monitoring device;

FIG. 5 is a graphical illustration of a combination of a Time-Temperature Indicator and electronic monitoring device in accordance with the invention; and FIGS. 6A through 6C are graphical illustrations depicting preparing a combination of a Time-Temperature Indicator and electronic monitoring device in accordance with one embodiment of the invention.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The invention is a method of monitoring the temperature to which an object has been exposed comprising combining a Time-Temperature Indicator (TTI) with an electronic monitoring device (EM device). The TTI device provides a rapid initial determination as to whether the temperature may have exceeded a predetermined threshold. The electronic monitoring device functions to reduce or prevent the rejection of goods based on inaccurate TTI readings.

Time-Temperature Indicators that may be used in the invention include a broad range of devices that can visually indicate a cumulative time-temperature exposure or temperature history of an object. TTIs typically indicate that a temperature threshold may have been exceeded by producing a visual physical change, such as a change in color. TTIs may use a mechanical, chemical, electrochemical, enzymatic, or microbiological change to indicate through a visible response that the predetermined threshold may have been exceeded. The visible response may be expressed in the form of a mechanical deformation, color development, or color movement. In some embodiments, the TTI may use a diffusion based indicator, enzymatic indicator, or polymerization based indicator.

Typically, TTI devices can be configured to show a visual change at a predetermined time-temperature threshold. The predetermined threshold for the label may be the same or different than the expiration threshold of the object being monitored. An appropriate TTI device can be selected based on a desired time-temperature threshold and the specific nature of the object or goods to be monitored.

The TTI in some embodiments may include an adhesive substrate that can be used to mount or position the TTI in a temperature monitoring relationship with an object or goods. TTI devices having an adhesive substrate layer are commonly referred to as TTI labels. In alternate embodiments, the TTI label can be attached to an object using, for example, tape, glue, mechanical fasteners, and the like. Preferably, the TTI label may be easily activated by a user at the start of temperature monitoring.

In some embodiments, the TTI label can produce a visual response immediately after being exposed to a predetermined temperature. In other embodiments, the TTI label may produce a visual response only after prolonged exposure to the predetermined temperature. In still other embodiments, the TTI label may produce a scaled visual change that can be compared to a reference scale. The scale can be used to make an initial determination of the duration and extent of temperature exposure. Exemplary TTI devices are described in U.S. Pat. Nos. 5,368,905; 5,057,434; 5,667,303; 5,709,472; 6,042,264; and 6,544,925.

Electronic monitoring devices that are useful in the invention include small portable electronic devices, such as data loggers, that can be programmed to collect and record specific measurements. The electronic monitoring devices (EM devices) are typically battery powered and comprise a microprocessor, instruments for taking measurements, and recordable storage medium for storing data. Typical measurements include temperature, relative humidity, light intensity, on/off, open/closed, voltage, pressure, and events over time. In some embodiments, the EM devices can be about the size and shape of a "credit card." Card shaped EM devices can be deployed in a wide variety of applications where small size may be desirable. Preferably, the EM devices are small, inexpensive, and as such, may not contain an integral visual display. The EM devices in some embodiments may be reused multiple times.

In some embodiments, the EM device may also include input/output (I/O) terminals for communication with a reader. The EM device may also include a radio frequency (RF) transceiver that can wirelessly send and receive data between the EM device and a reader. The EM device can also include a radio frequency identification (RFID) communication means or interface that can enable wireless communication with the EM device. EM devices that are useful in the invention must monitor temperature, and may additionally monitor and record a wide variety of conditions including, but not limited to, humidity, pressure, on/off cycles, and the like. EM devices can be activated in wide variety of ways. In some embodiments, the EM device may be manually activated by pushing a button or triggering a switch. In other embodiments, the EM device can be activated through wired or wireless communication with a computer or reader, such as a RFID reader. Exemplary EM devices are described in U.S. Pat. Nos. 5,313,848; 6,320,512; and 6,411,916. A preferred EM device is produced under the trade name TempSens® by KSW Microtec.

The combined TTI label and EM device may be used to monitor temperature exposure of a wide variety of objects including, but not limited to, pharmaceuticals, food products such as meats, produce, and diary products, electronics, chemicals, cosmetic products, biological products, and the like. An object that is to be monitored includes not only individual object such as a package, box, or crate, but can also include multiple objects including the monitoring of various goods or items.

With reference to FIG. 1, an exemplary method of monitoring the temperature to which an object has been exposed is illustrated and broadly designated as reference number 10. The method 10 provides a rapid means for ensuring that objects or goods have not been exposed to a predetermined temperature threshold.

As shown in FIG. 1, an electronic monitoring device that is adapted for monitoring and recording temperature readings is provided at step 20. A TTI in the form of a label (TTI label) may be provided at step 30. In steps 40 and 50, both the electronic temperature monitoring device (EM device) and the TTI label may be activated. The EM device and the TTI label may be activated concurrently or at different times. Preferably, the EM device and TTI label are activated within a relatively short time period of each other to ensure uniformity in the environmental conditions measured by both devices.

The EM device and the TTI label are positioned in a temperature monitoring relationship with the object or goods that are to be monitored at step 60. The exact nature of a temperature monitoring relationship can vary depending upon the environment in which the goods or objects are disposed. For instance, in some cases the goods or object may be disposed in an environment where there is minimal temperature variation. In this type of environment, the TTI label/EM device combination may be disposed at a greater distance from the goods or object without compromising the uniformity in temperature exposure of the TTI label and EM device. In other environments the temperature may fluctuate from point-to-point. To ensure uniformity in temperature exposure in this type of environment, it may be desirable to position the TTI label and EM device in close proximity to one another and in close proximity to the object or goods to be monitored. In embodiments where the object or goods have an insulation layer, it may be desirable to position both the TTI label and EM device on the same side of the insulation layer. Preferably, the temperature to which the TTI label and EM device are exposed while in a temperature monitoring relationship should vary no more than ±5° C. of the actual temperatures to which the object or goods are exposed.

The TTI label may be visually inspected to determine if the temperature to which the object has been exposed may have exceed the predetermined threshold at step 70. The TTI label may be used to indicate an elevated possibility that the object or goods may have been exposed to time-temperature history in excess of the predetermined threshold. Step 70 may occur at various points in the distribution process. For example, the combination can be used to monitor temperature exposure during storage, transportation, and at the point of display. The TTI label could also be used to routinely verify that stored objects or goods have not exceeded the predetermined threshold. As a result, the TTI label/EM device combination can be used to monitor temperature exposure in a variety of applications and circumstances.

In the event that visual inspection of the TTI label indicates the possibility that a temperature event (i.e., temperature threshold exceeded) may have occurred, stored temperature readings can be retrieved from the EM device at step 80. The temperature data stored in the EM device can give a more accurate and complete temperature history of the object or goods. The temperature history may be used to determine the time of occurrence and duration of any possible temperature event. As a result, the combination can be used to reduce the chance that objects or goods may be rejected based on inaccurate TTI readings. In addition, the EM device may be used to make a determination as to the effect of the temperature exposure on the object or goods. In some cases, the exposure may produce a minimal or negligible impact on the object or goods. In other cases, the exposure could be to such an extent and duration that the goods should be rejected or disposed.

With reference to FIG. 2, a method of monitoring the temperature to which an object has been exposed is illustrated and broadly designated as reference 100. Method 100 is in accordance with method 10 (see FIG. 1), and further comprises additional steps for handling objects or goods at the completion of step 70.

The TTI label is visually inspected to determine if the temperature to which an object has been exposed may have exceeded a predetermined threshold at step 70. If visual inspection of the TTI label does not indicate that a temperature event may have occurred, the object or goods can be processed in the normal course of business at step 90. The normal course of business refers to the manner in which acceptable goods would normally be treated or handled. For instance, it could refer to continued storage of the goods, shipment of the goods, sale of the goods, or acceptance of the goods.

In the event that visual inspection of the TTI label indicates that a temperature event may have occurred, stored temperature readings from the EM device can be retrieved at step 80. The EM device is typically connected to a reader or computer to retrieve the data. If the stored temperature readings indicate that excessive time-temperature exposure has not occurred, the object or goods are processed in the normal course of business at step 90. If the stored temperature readings at step 80 verify that excessive time-temperature exposure has occurred, the object or goods can be processed as rejected at step 85. There are a variety of different actions that can be taken with respect to a rejected object or goods. For instance, the rejected object or goods can be returned to the point of origination, such as a supplier, the object or goods can be held for a subsequent investigation, they could be sold at a discounted price, positioned so as to receive expedited sale or delivery and/or extra cold storage, or the object or goods could be disposed or discarded. As described above, the stored temperature readings may also be used to determine the time of occurrence of temperature exposure events on the object or goods so that appropriate action may be taken.

In some embodiments, a TTI label may have a predetermined threshold that is lower than the actual expiration threshold for the object being monitored. A TTI having a lower predetermined threshold can statistically be expected to give more positive (reject) readings than inaccurate negative (accept) readings. For example, a TTI having a lower predetermined threshold that is designed to give a positive reading after 10 days at 25° C. could be used to monitor a product which must not be at 25° C. for more than 20 days. In this case, the TTI would be expected to give a positive (reject) reading before a product needs to be rejected, but should rarely give a negative reading (accept) reading on a product that should be rejected. Thus, TTI labels that indicate an acceptable temperature history can be regarded as more conclusive and can be accepted without retrieving stored temperature readings from the EM device. If the TTI label indicates that the lower time-temperature threshold may have been exceeded, the temperature readings in the EM device can be used to determine if the object has in fact been exposed to a time-temperature history in excess of the expiration threshold for the object.

With reference to FIG. 3, an embodiment of the invention comprising a combined EM device and a TTI label is illustrated and broadly designated as reference number 200. As shown in FIG. 3, the combination 200 of the EM device 242 and the TTI label 220 can be used in conjunction with an envelope 240. The envelope typically comprises an interior space into which the EM device 242 can be insertably disposed. In some embodiments, the envelope 240 comprises a flap 246 that may or may not be sealable. FIG. 2 illustrates a sealable flap 246 having an adhesive surface 248 for sealably closing the envelope.

FIG. 3 illustrates an exemplary TTI label 220 that is mounted or attached to the envelope 240. The TTI label comprises a visual indicator 222 for indicating the possibility that a temperature event may have occurred. In the embodiment shown in FIG. 3, the visual indicator 222 comprises a central dot that can change colors to indicate the possibility that the predetermined threshold may have been exceeded. In some embodiments, the TTI label 220 may include instructions or a reference scale 224. The instructions may direct a user how to activate and read the TTI label. In still other embodiments, the visual indicator may be adapted to change to a variety of different colors that can be used to indicate the nature and/or duration of the temperature exposure. The color of the indicator can be referenced against the scale. It should be recognized that the TTI label may use other methods of visually indicating that a temperature event may have occurred, and that the invention is not limited to the above described TTI label.

In some embodiments, the envelope can contain instructions 244 for using and reading the EM device and TTI label combination. For instance, the instructions could direct the recipient of the goods to first visually inspect the TTI label to determine if a temperature event may have occurred. The instructions could further direct the recipient to retrieve the stored data if visual inspection of the TTI label indicates a possible temperature event. The label may also contain a mailing label (not illustrated) that can be used to mail the envelope and its contents to a desired recipient. In some embodiments, the envelope and EM device could be returned for later reuse. The envelope can be mounted or attached to an object or goods in a variety of ways. The envelope may contain an adhesive layer on one of its surfaces so that it can be easily adhered to an individual object, pallet of goods, or other packaging configuration. The envelope could be attached to an object in a variety of ways including, but not limited to glue, tape, string, mechanical fasteners such as staples, and the like. Alternatively, the envelope could be disposed within or adjacent to the object.

FIG. 4 illustrates an embodiment broadly designated as reference number 300, wherein an EM device 242 and a TTI label 240 combination are mounted to the surface of an object that is in the form of a package 310. In this embodiment, the TTI label and the envelope 240 containing an EM device may be separately attached to the package. In alternate embodiments, the envelope may be disposed within the packaging.

In some embodiments, a single combination of an EM device and TTI label may be used to monitor the temperature exposure of a plurality of goods or objects. In this regard, FIG. 5 illustrates a pallet of goods in the shipping process having a single TTI label/EM device combination 200. The shipping process illustrated in FIG. 5 is broadly designated with reference number 500. The pallet of goods 510 are depicted as being bundled together for shipment on single pallet 520. The pallet of goods 510 includes a single combination 200 that may be used to monitor temperature exposure for the entire pallet of goods. FIG. 5 illustrates the combination comprising an envelope 240 containing an EM device 242, and a TTI label 220 attached to the outer surface of the envelope. It should also be recognized that in some embodiments, a single combination could be used to monitor temperature exposure of multiple pallets of goods, or the entire contents of a shipping container, provided that the combination maintains a temperature monitoring relationship with all the goods that are to be monitored.

With reference to FIGS. 6A through 6C, a process of preparing an envelope comprising a combination of a TTI label and EM device is illustrated. FIG. 6A illustrates insertably disposing an activated EM device 242 into the interior of an envelope 240. In the next step, a protective strip 249 preventing exposure of an adhesive layer is 248 is peelably removed. The flap 246 may then be folded over the opening of the envelope to sealably close the envelope. In FIG. 6C a TTI label 220 is activated and attached to the outer surface of the envelope 240. In alternate embodiments, the EM device and TTI label could be activated before or after being inserted or attached to the envelope.

In an alternate embodiment, the combination can comprise a TTI label attached directly to an EM device. The TTI label could be adhered or mechanically fastened to the EM device. In this embodiment, the combination could be disposed in an envelope, package, attached to an object, or the like.

The invention may also include a method of shipping or transporting a package or object in which the temperature to which the package is exposed during shipment is monitored. Similar to the method described above, the method of monitoring transport of a package or object comprises positioning a TTI label/EM device combination in a temperature monitoring relationship with the package to be transported.

Many modifications and other embodiments of the invention set forth herein will come to mind to one skilled in the art to which the invention pertains having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for monitoring the temperature exposure of an object comprising:
   a) providing an electronic temperature monitoring device adapted for electronically monitoring and recording temperature readings;
   b) providing a time-temperature indicator label adapted for visually indicating an increased probability of a time-temperature exposure above a predetermined threshold;
   c) activating said electronic temperature monitoring device;
   d) activating said label;
   e) positioning said electronic temperature monitoring device and said label in a temperature monitoring relationship with the object;
   f) visually inspecting said label for indication that the time-temperature exposure of the object exceeded the predetermined threshold; and
   g) retrieving stored temperature readings from said electronic temperature monitoring device if the visual inspection of said label indicated that the time-temperature exposure exceeded the predetermined threshold.

2. A method according to claim 1, wherein the electronic temperature monitoring device is attached to the object.

3. A method according to claim 1, wherein the label is attached to the object.

4. A method according to claim 1, wherein said electronic temperature monitoring device is disposed in an envelope, and said label is attached to the envelope.

5. A method according to claim 1, wherein said label is attached to said electronic temperature monitoring device.

6. A method according to claim 1, wherein the object has an expiration temperature threshold that is the same as the predetermined temperature threshold of the label.

7. A method according to claim 1, wherein the label has a predetermined threshold that is lower than the expiration threshold of the object.

8. A method according to claim 7, wherein the step or retrieving stored temperature readings from said electronic temperature monitoring device further comprises analyzing said readings to determine if the object has been exposed to a temperature history above the expiration threshold of the object.

9. A method according to claim 1, wherein said electronic temperature monitoring device comprises an instrument capable of performing temperature readings, a storage medium capable of storing temperature readings, a microprocessor, and a battery.

10. A method according to claim 9, wherein said electronic temperature monitoring device further comprises a RFID communication interface.

11. A method according to claim 9, wherein said electronic temperature monitoring device comprises a data logger.

12. A method according to claim 1, wherein said label visually indicates a time-temperature exposure above said predetermined threshold in the form of a mechanical deformation, color development, color movement, or color change.

13. A method according to claim 1, wherein the label comprises a diffusion based indicator, enzymatic indicator, or polymerization based indicator.

14. A method according to claim 1, wherein said electronic temperature monitoring device and said label are activated concurrently.

15. A method according to claim 1, wherein the step of retrieving the stored temperature readings from said electronic temperature monitoring device further comprises connecting said electronic temperature monitoring device to a reader adapted for communicating with said electronic temperature monitoring device.

16. A method according to claim 1, further comprising the step of:
   h) analyzing the stored temperature readings retrieved from said electronic temperature monitoring device to determine the temperature history to which the object was exposed.

17. A method according to claim 16, further comprising at least one of the following steps:
   i) disposing of the object that has been exposed to a time-temperature exposure above the predetermined threshold;
   j) accepting the object that has been exposed to a time-temperature exposure above the predetermined threshold;
   k) returning the object that has been exposed to a time-temperature exposure above the predetermined threshold to a supplier; or
   l) selling the object that has been exposed to a time-temperature exposure above the predetermined threshold at a discounted price.

18. A method of monitoring the temperature history of a package while in shipment comprising:
   a) providing a package to be shipped;
   b) providing an electronic temperature monitoring device adapted for electronically monitoring and recording temperature readings;
   c) providing a time-temperature indicator label adapted for visually indicating an increased probability of a time-temperature exposure above a predetermined threshold;
   d) activating said electronic temperature monitoring device;
   e) activating said label;
   f) attaching said electronic temperature monitoring device and said label to said package;
   g) shipping said package;
   h) visually inspecting said label for a visual indication that the time-temperature exposure of the package exceeded the predetermined threshold; and i) retrieving stored temperature readings from said electronic temperature monitoring device if the visual inspection of said label indicated that the time-temperature exposure exceeded the predetermined threshold.

19. A method of shipping a package according to claim 16, wherein said electronic temperature monitoring device is disposed in an envelope that is attached to an outer surface of said package.

20. A method of transporting a package according to claim 18, wherein said label is adhered to an outer surface of said package.

* * * * *